US00RE42121E

(19) United States
(12) Reissued Patent
Uzun

(10) Patent Number: US RE42,121 E
(45) Date of Reissued Patent: Feb. 8, 2011

(54) METHOD AND SYSTEM FOR A HIERARCHICAL TRAFFIC SHAPER

(75) Inventor: Necdet Uzun, Miami Beach, FL (US)

(73) Assignee: New Jersey Institute of Technology, Newark, NJ (US)

(21) Appl. No.: 11/432,800

(22) Filed: May 11, 2006

Related U.S. Patent Documents

Reissue of:
(64) Patent No.: 6,735,214
Issued: May 11, 2004
Appl. No.: 09/481,176
Filed: Jan. 12, 2000

(51) Int. Cl.
*H04L 12/28* (2006.01)

(52) U.S. Cl. ..... 370/411; 370/412; 370/437; 370/468

(58) Field of Classification Search ..... None
See application file for complete search history.

(56) References Cited

U.S. PATENT DOCUMENTS 5,231,633 A 7/1993 Hluchyj et al.
5,499,238 A 3/1996 Shon
6,104,700 A 8/2000 Haddock et al.
6,167,030 A * 12/2000 Kilkki et al. ..... 370/236
6,421,342 B1 * 7/2002 Schwartz et al. ..... 370/392
6,507,592 B1 * 1/2003 Hurvig et al. ..... 370/503
6,563,837 B2 * 5/2003 Krishna et al. ..... 370/413
6,678,277 B1 * 1/2004 Wils et al. ..... 370/412
6,687,246 B1 * 2/2004 Wolrich et al. ..... 370/388

* cited by examiner

*Primary Examiner*—Phirin Sam

(57) ABSTRACT

A method of sorting packets for transmission over a communication network. The packets are sorted into groups in accordance with predetermined criteria, wherein the number of groups is equal to at least three times the square root of a fraction whose numerator is the maximum transmission rate and whose denominator is the minimum transmission rate. Each group is assigned a first departure time in accordance with the predetermined criteria. Each packet of each group is assigned a second departure time. Wherein the number of the departure time is equal to the square root of a fraction whose numerator is the maximum rate and whose denominator is the minimum transmission rate. Each packet is transmitted over the communication network in accordance with the second departure time.

42 Claims, 7 Drawing Sheets

METHOD AND SYSTEM FOR A HIERARCHICAL TRAFFIC SHAPER

Matter enclosed in heavy brackets [ ] appears in the original patent but forms no part of this reissue specification; matter printed in italics indicates the additions made by reissue.

FIELD OF INVENTION

The present invention relates to the field of packet based communication systems and particularly switching technology.

BACKGROUND

Telephony, desktop video conferencing, video on demand, and other popular networking applications impose an increasing demand for bandwidth and simultaneous support of different types of service on the same communication network. To meet these demands, various high performance communication technologies are being deployed, including transmission over cable television lines using cable modems and DSL telephony services. One prominent data packet based technology is Asynchronous Transfer Mode (ATM).

ATM is designed to deal with the problem that some applications require very low latency, while other applications cannot tolerate loss of information but can support reasonable delays. Users also want a predictable and consistent level of quality when using a service. Quality of service (QoS) therefore becomes a key factor in the deployment of the next generation of networks. QoS differentiates services from one another by category. A service is represented to be a certain quality if it can consistently meet the same level of quality for a given set of measurable parameters. In traditional telephone systems, for example, QoS is measured in terms of delay to obtain dial tone, delay to set up the connection, trunk availability, quality of sound (e.g., noise, echo), and reliability of the connection. On the other hand, the Internet was designed as a "best effort" network, and did not originally intend to make any QoS commitments.

The various service categories supported by ATM are constant bit rate (CBR) service, variable bit rate (VBR) service, available bit rate (ABR) services guaranteed frame rate (GFR) service, and the residual category, unspecified bit rate (UBR) service.

In supporting these various service categories, network providers are therefore faced with a set of conflicting requirements. In response to market demand, network providers have to maximize network efficiency while meeting the specific QoS needs of the applications. The networks must also be capable of sharing bandwidth fairly among users and ensuring that any given user traffic cannot affect the QoS of other users. In addition, the networks have to support permanent connections as well as switched connections, which have very different holding time and utilization characteristics. Permanent connection are not set up and torn down frequently, but the link bandwidth may not be utilized at all times. In contrast, switched connections are set up and torn down frequently and the link bandwidth is generally highly utilized during the lifetime of the connection. Because of the diversity in the link speeds both in the accrues to the network and in the trunks, large speed mismatches need to be handled efficiently.

The inherent conflict created by the need to optimize bandwidth while ensuring different QoS can be resolved by using a combination of traffic control or traffic management techniques. A multiservice ATM network provides support for a wide variety of services with differing QoS requirements to be carried on the same switching nodes and links. Multiple services share the network resources (e.g., link bandwidth, buffer space, etc.) and may try to access a resource simultaneously. Resource contention arises because of this sharing, and buffering is required to temporarily store data packets. (In discussions of ATM technology a data packet is customarily referred to as a cell. According, this terminology will be adopted for purposes of this specification.)

The point at which this resource contention occurs is generally referred to as a "queuing" or "contention point". Depending on the architecture, a switching node can be implemented with one or more queuing structures. A scheduling mechanism is implemented at each queuing structure to appropriately select the order in which cells should be served to meet the QoS objectives. A queuing structure and the corresponding scheduling algorithm attempt to achieve sometimes conflicting goals: (a) the flexibility to support a variety of service categories, and to easily evolve in support of new services; (b) the scalability to be simple enough to allow scaling up to large number of connections while allowing cost effective implementation; (c) the efficiency to maximize the network link utilization; (d) the guaranty of QoS to provide low jitter and end to end delay bounds for real time traffic; and (e) fairness to allow fast and fair redistribution of bandwidth that becomes dynamically available.

A variety of architectures are used to achieve the appropriate degree of traffic shaping. The architecture most pertinent to the present invention is known as direct exact sorting. FIG. 1 illustrates the direct exact sorting architecture used in the prior art. The direct exact sorting architecture employs a plurality of data structures known as queues. Each queue is a data structure in a which a plurality of cells are stored in memory in a sequential order. (The order is not physically sequential but is ordered by the software of the circuitry of the switch.) Because of the sequential order, there is a first cell and last cell in each queue. The queues release cells on a first-in first-out basis; consequently the last cell in sequence is referred to as the Head of Line ("HoL") cell.

Referring to FIG. 1, this architecture employs a virtual connection queues stage 100 at the front end. Following the virtual connection queues stage 100, there is a timing queues stage 102. Following timing queues stage 102, a departure queue stage 104 is used to store the cells. When a cell arrives, it will be appended to a virtual connection queue based on its connection identifier which is determined by its virtual channel identifier and virtual path identifier. According to this cell's traffic contract, its departure time will be calculated by the algorithm commonly known in the prior art as associated dual leaky buckets. According to its assigned departure time, the cell is then appended to one of time queues shown in FIG. 2. Once real time pointer 214 points to a timing queue, all cells in the queue are appended to the departure queue 216 which for example would include cells 212, 210 and 208, where cells 212 all came from one timing queue and cells 210 all came from a second timing queue.

In the direct exact sorting architecture of the prior art, all cells with the same departure time are appended to the same timing queue, so the departure time of a cell becomes the sequence number indicating the timing queue to which the cell will be appended. This timing queue technology reduces the implementation complexity of the exact sorting of the time stamps. In particular, it avoids comparison and insertion operations which are time consuming.

In order to physically implement the direct exact sorting architecture of the prior art, the number of the timing queues can not be infinite. As a result, it is necessary to reuse the timing queue sequence numbers corresponding to the time stamps. As shown in FIG. 2, there are M timing queues including timing queues 200, 202, 203, 204 and 206. These timing queues must deal with connections that have a variety of cell rates. If rate_max is the maximum cell rate and rate_min is the minimum cell rate, the real time pointer must satisfy two conflicting objectives. First, the real time pointer must be moving at a rate of at least rate_max in order to service the connection with the maximum cell rate. (The rate of the real time pointer is measured in terms of timing queues per second.) Second, the departure time of the cells with the minimum cell rate must not be so much further in the future (that is, 1/rate_min) than the current state of the real time pointer that there is no appropriate timing queue to which the cell may be appended. These two objectives will be satisfied if (a) M is greater than or equal to rate_max/rate_min and (b) the rate of real time pointer is rate_max.

The direct exact sorting architecture suffers from a severe deficiency in that connections vary over a wide range of rates. Consequently, the value M may be very large. In addition, the value of M will increase linearly with the range of rate increasing, which means that the complexity of the implementation of this architecture will increase linearly. So this architecture is not suitable for accommodating connection with a very wide range of rates.

SUMMARY OF INVENTION

One aspect of the invention is a method of sorting packets for transmission over a communication network including the steps of sorting the packets into groups in accordance with predetermined criteria, assigning to each group a first departure time in accordance with the predetermined criteria, assigning to each packet of each group a second departure time in accordance with the predetermined criteria and transmitting each packet over the communication network in accordance with the second departure time.

Another aspect of the invention is a method of sorting packets for transmission over a communication network including the steps of sorting the packets into groups in accordance with predetermined criteria, wherein the number of groups is equal to two times the square root of a fraction whose numerator is the maximum transmission rate and whose denominator is the minimum transmission rate, assigning to each group a first departure time in accordance with the predetermined criteria, assigning to each packet of each group a second departure time, wherein the number of said departure time is equal to the square root of a fraction whose numerator is the maximum transmission rate and whose denominator is the minimum transmission rate, and transmitting each packet over the communication network in accordance with said the departure time.

BRIEF DESCRIPTION OF THE DRAWINGS

The present invention is made more readily understandable by reference to the accompanying drawings in which.

DETAILED DESCRIPTION OF PREFERRED EMBODIMENTS

Figure 1:
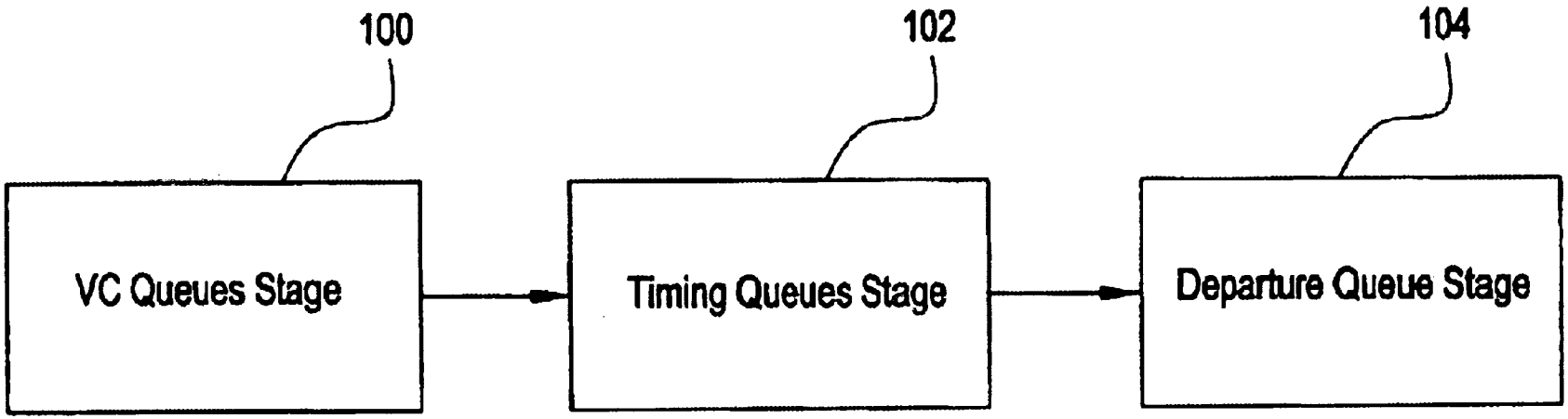
FIG. 1 PRIOR ART
FIG. 1 is a block document of the various stages used by prior art switches.
Figure 2:
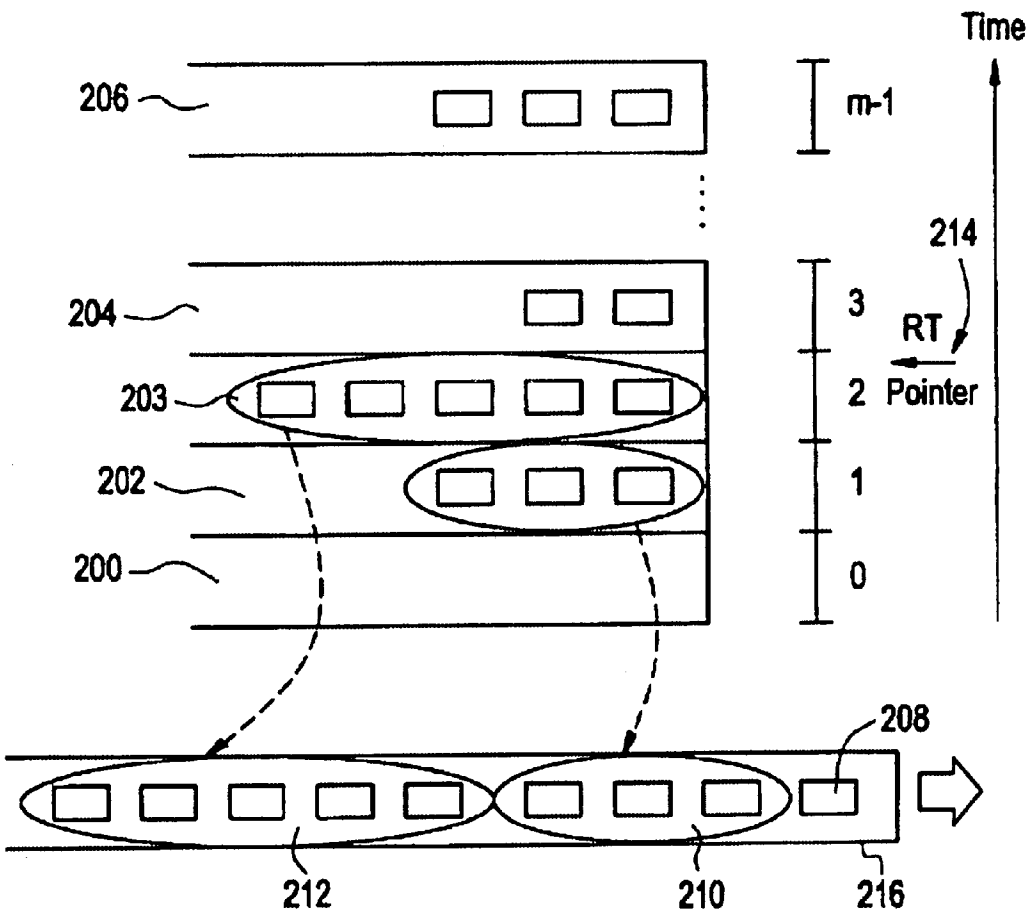
FIG. 2 PRIOR ART
FIG. 2 is an illustration of certain details of the operation of the timing queues stage and the departure queue stage used by prior art switches.
Figure 3:
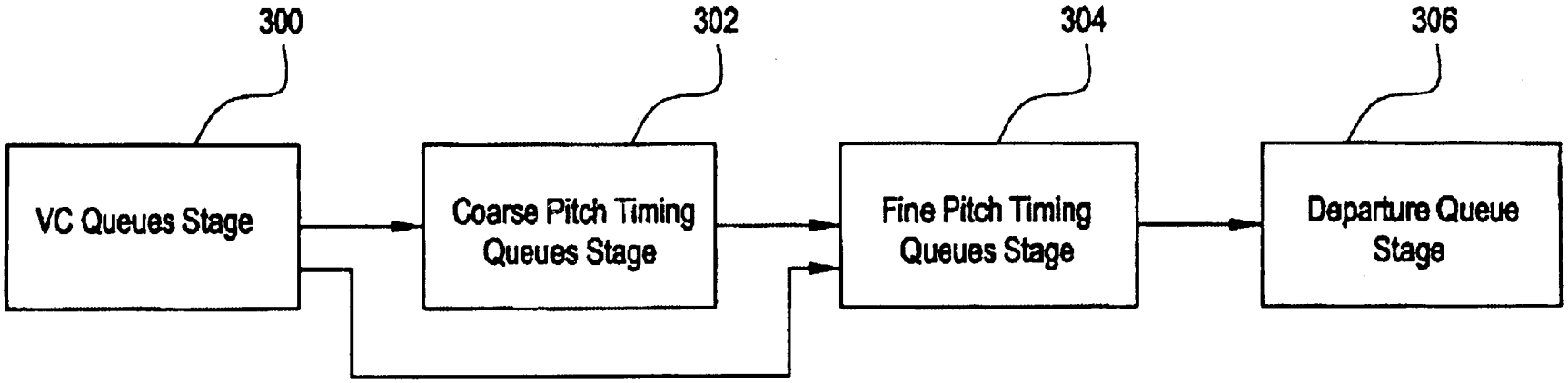
FIG. 3 is a block diagram of the various stages used in a preferred embodiment of the present invention.

Referring now to FIG. 3, a block diagram is shown of an improved traffic shaper that uses a technology that is an improvement on direct exact sorting as it is implemented in the prior art. As shown in FIG. 3, a first preferred embodiment of the present invention consists of four stages instead of the three-stage architecture. Virtual connection queues stage 300 sorts the cells into queues based on each cell's virtual channel identifier and virtual path identifier or based on any other classification. A cell travels from virtual connection queues stage 300 to either (a) coarse pitch timing queues stage 302 or (b) fine pitch timing queue stage 304 depending on how soon it is scheduled to depart from the traffic shaper. The cells in coarse pitch timing queue stage 302 have to travel to fine pitch timing queue stage 304. From fine pitch timing queue stage 304 the cell travels to departure queue stage 306. (For purposes of this specification the virtual connection queues stage 300 is referred to as the "front end of the traffic shaper", and coarse pitch timing queues stage 302 has to travel, fine pitch timing queues stage 304 and departure queue stage 306 are collectively referred to as the "back end of the traffic shaper".)

Figure 4:
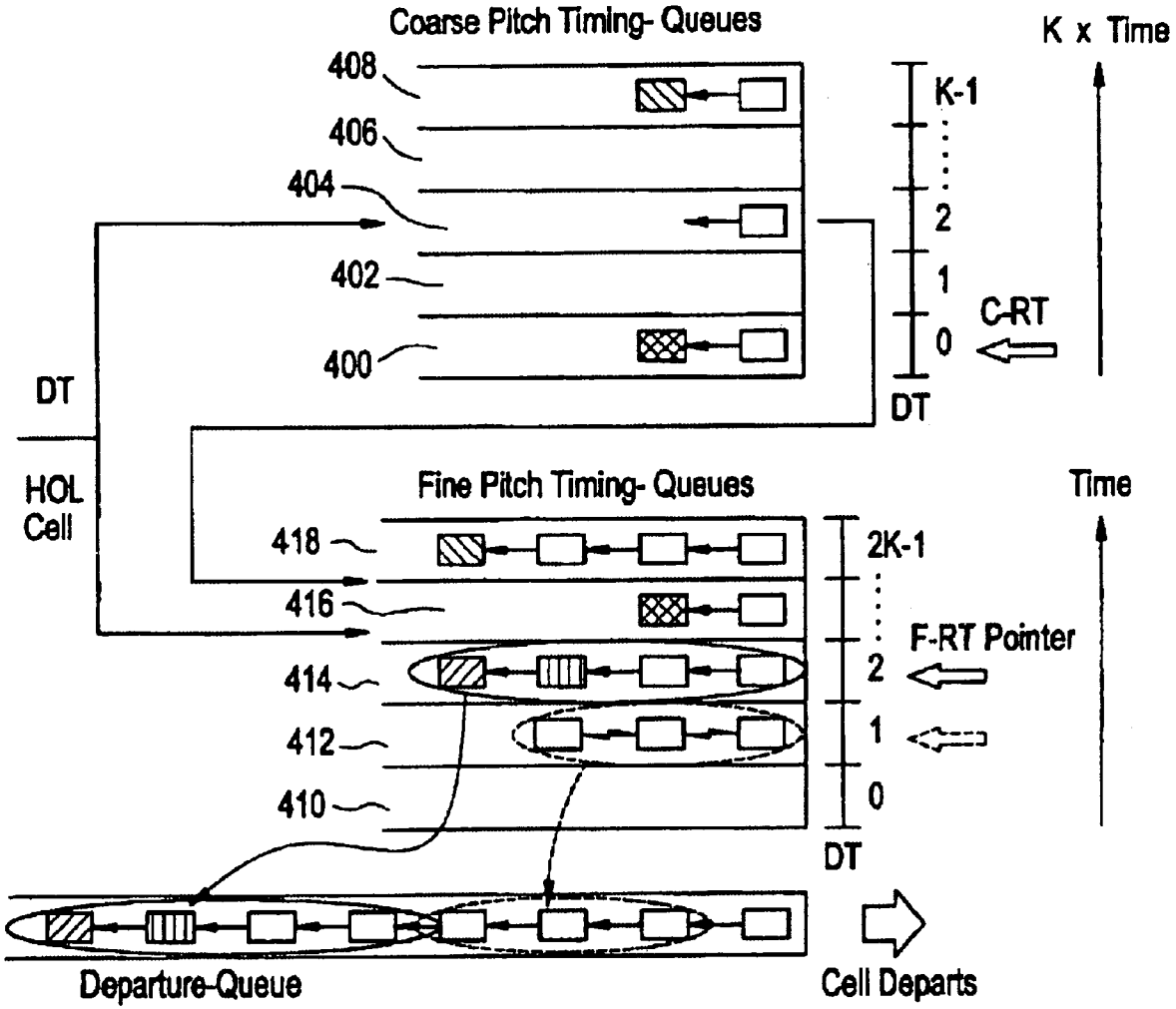
FIG. 4 is an illustration of certain details of the operation of the coarse pitch timing queues state, the fine pitch timing queues stage and the departure queue.
Figure 5:
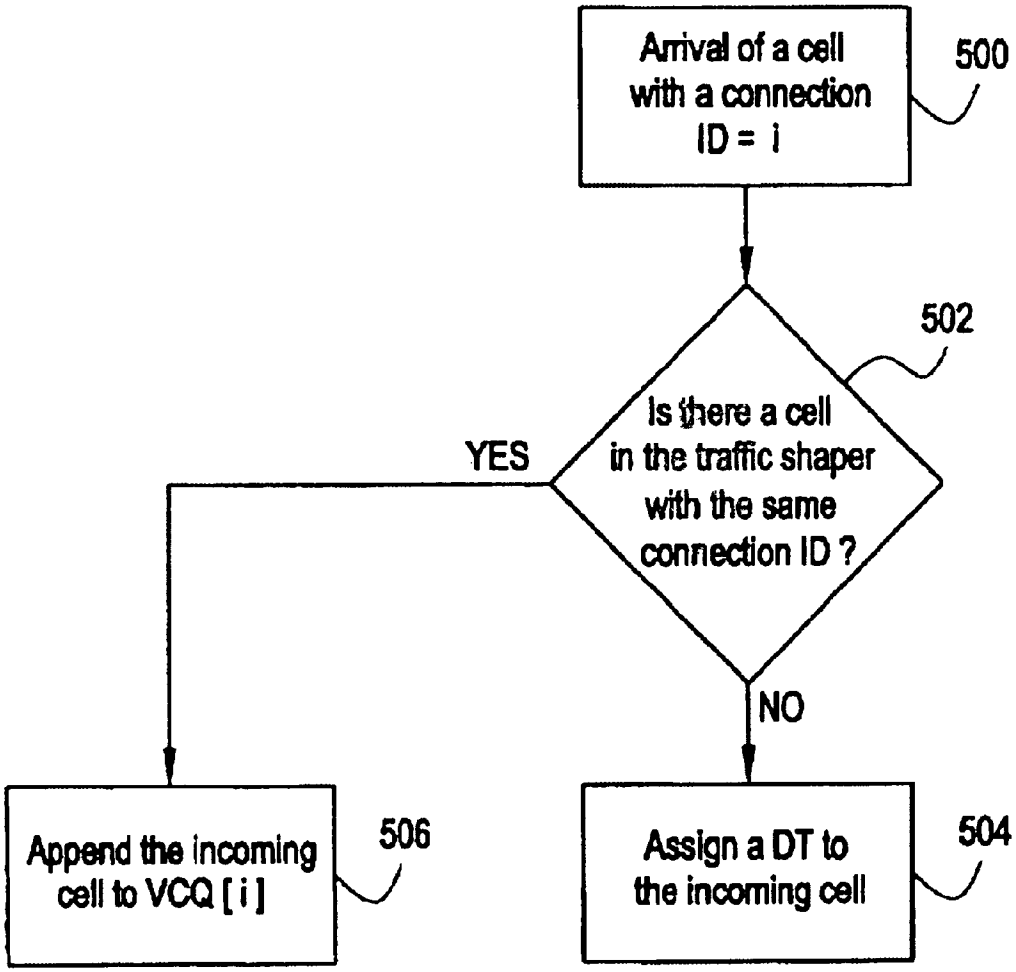
FIG. 5 is a flow chart illustrating an algorithm for assigning a departure time to a cell in a preferred embodiment of the present invention. This operation is triggered by an arriving cell to a virtual connection queue.

FIG. 4 illustrates the operation of the various queues in detail. The HoL cell is assigned a departure time by either the algorithm set forth in the flow chart in FIG. 5 or the flow chart in FIG. 7. The algorithm illustrated in FIG. 5 commences with the arrival of a cell with a particular connection identifier in step (500). In step (502) the traffic shaper determines if there is a cell with the same connection identifier in the back end of the traffic shaper. If there is such a cell then the incoming cell is buffered in step (506) by being appended to a virtual connection queue. If there is not such a cell, then the cell is assigned a departure time in step (504).

Figure 7:
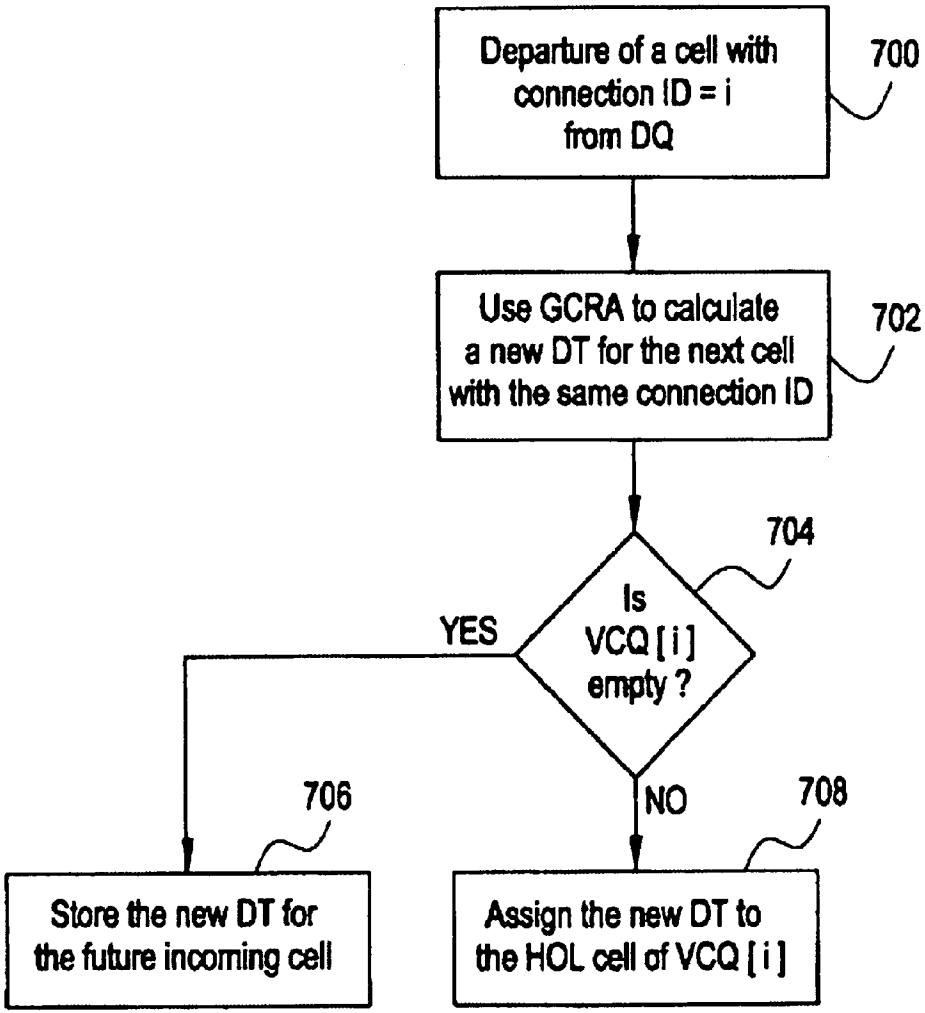
FIG. 7 is a flow chart illustrating an algorithm for assigning a departure time to a cell in a preferred embodiment of the present invention. This operation is triggered by the cell's departure from the departure queue.

The algorithm illustrated in FIG. 7 commences with departure of a cell with a specific connection identifier from the back end of the traffic shaper in the step (700). In step (702), the traffic shaper then uses a standard generic cell rate algorithm to calculate the departure time for the next cell with the same connection identifier. The traffic router in step (704) then tests if there is a cell with the same virtual connection identifier in the front end of the shaper. If the virtual connection queue in the front end of the traffic shaper for cells with that connection identifier is not empty, then in step (708) the departure time is assigned to the HoL cell in that virtual connection queue. Otherwise, in step (706) the departure time is stored for a future incoming cell with the same virtual connection identifier.

The departure time consists of two values: DT_ct and DT_ft. Dt_ct refers to the departure time determined on a coarse scale and DT_ft refers to the departure time determined on a fine scale.

The HoL cell is appended to one of the coarse pitch timing queues 400 through 408 based on the value of that cell's DT_ct if DT_ct is equal to RT_ct or if DT_ct is equal to RT__ct plus 1. Otherwise, the HoL cell is appended to one of the fine pitch timing queues 410 through 415 based on the value of that HoL cell's DT__ft.

Figure 6:
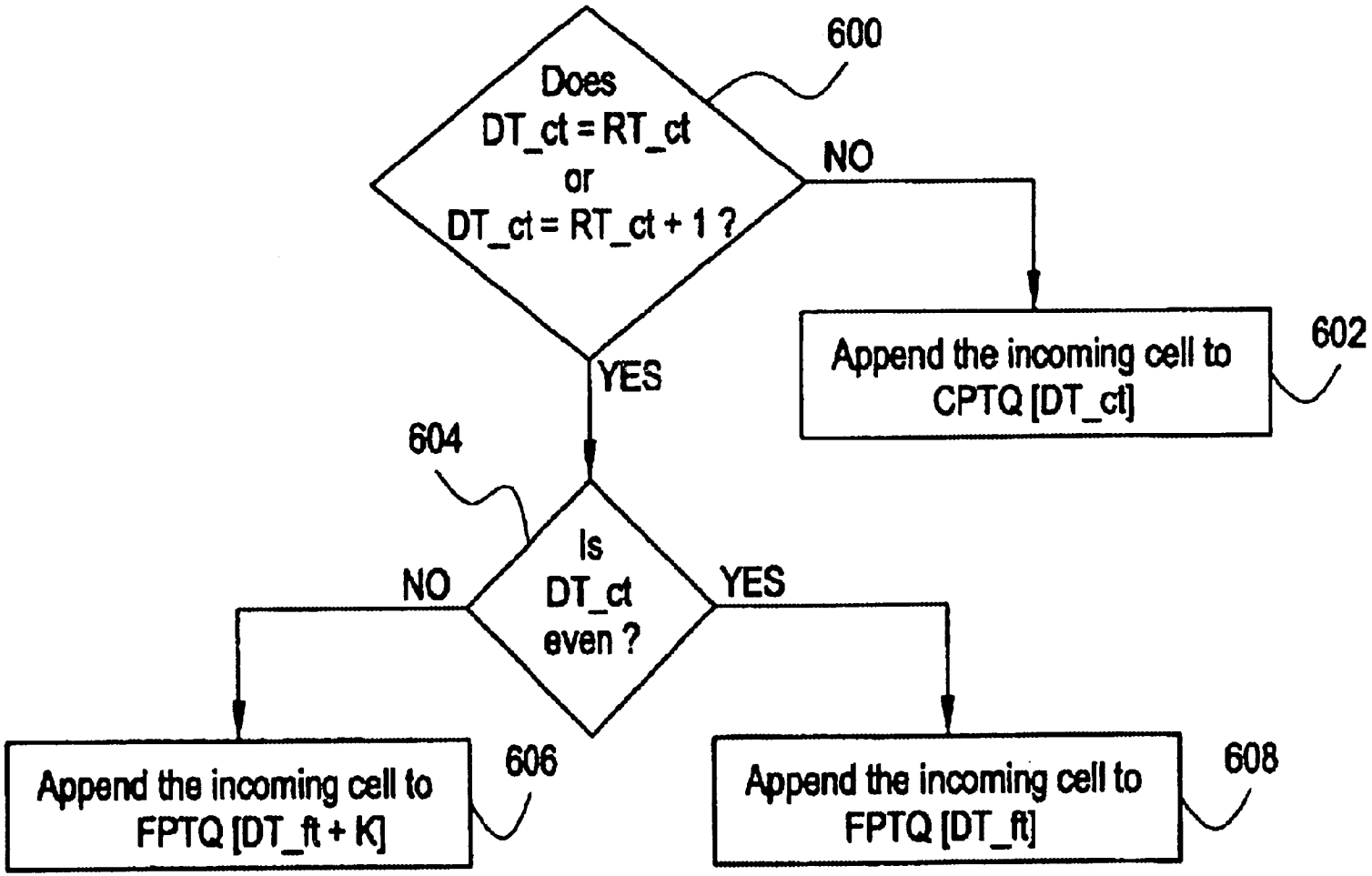
FIG. 6 is a flow chart illustrating an algorithm for assigning cells to course pitch queues and fine pitch queues.

A course pitch real time pointer continuously runs. When the course pitch real time pointer points to a specific coarse pitch timing queue, then the HoL cell in that queue is appended to one of the fine pitch timing queues based on the cell's DT__ft. The number of fine pitch timing queues is two times the number of course pitch timing queues. As shown in the algorithm illustrated in FIG. 6. At step (600) the algorithm determines if DT__ct is equal to RT__ct or if DT__ct is equal to RT__ct plus 1. If these conditions are not satisfied then the cell is appended to CPTQ[DT__ct] at step (602). If these conditions, however, are satisfied then at step (604) the specific fine pitch timing queue of fine pitch queues 606 and 608 to which the HoL cell is appended is determined by (a) the value of DT__ft of the cell and (b) whether DT__ft is odd or even.

In a first preferred embodiment of the invention, the fine pitch real time pointer would be counting K times faster than the coarse pitch real time pointer. By maintaining that speed the the fine pitch real time pointer would never be waiting for cells to be transferred from the coarse pitch timing queues. In addition, while one half of the fine pitch timing queue is being served, the other half is appended with cells from the coarse pitch timing queue. These newly appended cells do not fall behind the fine pitch real time pointer.

The effective number of queues for sorting purposes are the number of coarse pitch timing queues, K, times one-half the number of fine pitch timing queues, which is also K. According the effective number of timing queues is K*K. In order for this first preferred embodiment to function correct:

$$K*K \geqq rate_max/rate_min. \text{ or}$$

$$K^2 \geqq rate_max/rate_min \text{ or}$$

$$K \geqq \sqrt{rate_max/rate_min}$$

The total amount of timing queues must therefore be at least 3 K or $$3 * \sqrt{rate_max/rate_min}.$$

This result compares favorably with the prior art where the number of timing queues is rate__max/rate__min.

Although the present invention has been described in terms of various embodiments, it is not intended that the invention be limited to these embodiments. Modification within the spirit of the invention will be apparent to those skilled in the art. For example in another embodiment, the VC Queues Stage 300 can be eliminated at the expense of increased timing queues. In this embodiment, an incoming cell is assigned a DT equal to DT__ct, DT__ft based on the GCRA algorithm and appended to the appropriate CPTQ or FPTQ. The DT calculation is only triggered by the arrival of a cell.

What is claimed:

1. A method of sorting packets for transmission over a communication network including the steps of:

(a) sorting the packets into groups in accordance with predetermined criteria, wherein the number of groups is equal to at least three times the square root of a fraction whose numerator is the maximum transmission rate and whose denominator is the minimum transmission rate;

(b) assigning to each group a first departure time in accordance with said predetermined criteria;

(c) assigning to each packet of each group a second departure time, wherein the number of said departure time is equal to the square root of a fraction whose numerator is the maximum rate and whose denominator is the minimum transmission rate; and (d) and transmitting each said packet over said communication network in accordance with said second departure time.

*2. A method comprising:*

*a network node assigning a departure parameter to a first packet, wherein the departure parameter includes a first value that corresponds to a first set of queues and a second value that corresponds to a second set of queues;*

*the network node selecting one of the first set of queues and the second set of queues to store the first packet responsive to the departure parameter;*

*the network node storing the first packet into a queue within the selected one of the first set of queues and the second set of queues; and*

*responsive to storing the first packet in one of the first set of queues, moving the first packet from the first set of queues to the second set of queues prior to transmitting the packet onto a communication network.*

*3. The method as recited in claim 2 further comprising the network node storing the first packet in a virtual channel queue corresponding to a virtual channel of the first packet, and wherein the departure parameter is assigned responsive to another packet from the virtual channel being transmitted onto the communication network.*

*4. The method as recited in claim 2 wherein the first value is relative to a first pointer to the first set of queues, wherein the first pointer indicates a given queue of the first set of queues.*

*5. The method as recited in claim 5 wherein the second value is relative to a second pointer indicating a given queue in the second set of queues from which a packet is being read.*

*6. The method as recited in claim 5 wherein at least one packet from the given queue is moving to the second set of queues at a time that the first pointer is indicating the given queue.*

*7. The method as recited in claim 2 further comprising the network node calculating the departure parameter dependent on a traffic contract corresponding to the first packet.*

*8. The method as recited in claim 2 further comprising the network node calculating the departure parameter dependent on a quality of service associated with the first packet.*

*9. The method as recited in claim 8 wherein the quality of service is constant bit rate service.*

*10. The method as recited in claim 8 wherein the quality of service is variable bit rate service.*

*11. The method as recited in claim 8 wherein the quality of service is available bit rate service.*

*12. The method as recited in claim 8 wherein the quality of service is guaranteed frame rate service.*

*13. The method as recited in claim 8 wherein the quality of service is unspecified bit rate service.*

*14. The method as recited in claim 2 wherein the communication network comprises cable media.*

*15. The method as recited in claim 2 wherein the communication network comprises digital subscriber line (DSL).*

*16. The method as recited in claim 2 wherein the first packet is a cell.*

*17. The method as recited in claim 2 wherein the first packet is an asynchronous transfer mode communication.*

*18. A method comprising:*

*a network node assigning a departure parameter to a first packet, the departure parameter including a first value that is relative to a first pointer to a first set of queues and further including a second value that is relative to a second pointer to a second set of queues;*

*the network node comparing the first value to the first pointer;*

*the network node storing the first packet in one of the first set of queues responsive to a first result of the comparing; and*

*the network node storing the first packet in one of the second set of queues responsive to a second result of the comparing;*

*wherein packets stored in the first set of queues are subsequently moved to the second set of queues responsive to the first pointer, and wherein packets stored in the second set of queues are subsequently moved to a departure queue responsive to the second pointer.*

*19. The method as recited in claim 18 wherein the first result comprises the first value equaling the first pointer.*

*20. The method as recited in claim 19 wherein the first result further comprises the first value equaling the first pointer plus one.*

*21. The method as recited in claim 20 wherein the second result comprises any result other than the first result.*

*22. The method as recited in claim 18 wherein the assigning is performed responsive to receiving the first packet.*

*23. The method as recited in claim 18 further comprising the network node storing the first packet in a virtual channel queue corresponding to a virtual channel of the first packet, and wherein the assigning is performed responsive to another packet from the virtual channel departing from the departure queue.*

*24. The method as recited in claim 18 wherein the second pointer changes values at a more rapid rate than the first pointer changes values.*

*25. The method as recited in claim 18 further comprising the network node moving at least one packet from one of the second set of queues to the departure queue and changing the value of the second pointer.*

*26. The method as recited in claim 25 further comprising the network node moving at least one packet from one of the first set of queues to one of the second set of queues and changing the value of the first pointer.*

*27. The method as recited in claim 18 wherein the one of the first set of queues into which the first packet is stored is determined responsive to the first value.*

*28. The method as recited in claim 18 wherein the one of the second set of queues into which the first packet is determined responsive to the second value.*

*29. A network node comprising a first set of queues and a second set of queues, wherein the network node is coupled to receive a first packet and is configured to assign a departure parameter to the first packet, wherein the departure parameter includes a first value relative to a first pointer to the first set of queues and a second value relative to the second set of queues, wherein the network node is configured to store the first packet into a queue within one of the first set of queues or the second set of queues, wherein the network node is configured to select the first set or the second set responsive to the departure parameter, and wherein, if the first packet is stored in one of the first set of queues, the network node is configured to move the first packet from the first set of queues to the second set of queues prior to transmitting the packet onto a communication network.*

*30. The network node as recited in claim 29 further comprising a set of virtual channel queues, wherein the network node is configured to store the first packet in a virtual channel queue corresponding to a virtual channel of the first packet, and wherein the network node is configured to assign the departure parameter responsive to transmitting another packet from the virtual channel on the communication network.*

*31. The network node as recited in claim 29 wherein the first pointer indicates a given queue of the first set of queues, wherein the network node is configured to move at least one packet from the given queue to a corresponding queue in the second set of queues.*

*32. The network node as recited in claim 29 wherein the network node is further configured to calculate the departure parameter dependent on a traffic contract corresponding to the first packet.*

*33. The network node as recited in claim 29 wherein the network node is further configured to calculate the departure parameter dependent on a quality of service associated with the first packet.*

*34. The network node as recited in claim 33 wherein the quality of service is constant bit rate service.*

*35. The network node as recited in claim 33 wherein the quality of service is variable bit rate service.*

*36. The network node as recited in claim 33 wherein the quality of service is available bit rate service.*

*37. The network node as recited in claim 33 wherein the quality of service is guaranteed frame rate service.*

*38. The network node as recited in claim 33 wherein the quality of service is unspecified bit rate service.*

*39. The network node as recited in claim 29 wherein the communication network comprises cable media.*

*40. The network node as recited in claim 29 wherein the communication network comprises digital subscriber line (DSL).*

*41. The network node as recited in claim 29 wherein the first packet is a cell.*

*42. The network node as recited in claim 29 wherein the first packet is an asynchronous transfer mode communication.*

* * * * *

UNITED STATES PATENT AND TRADEMARK OFFICE

CERTIFICATE OF CORRECTION

PATENT NO. : RE42,121 E
APPLICATION NO. : 11/432800
DATED : February 8, 2011
INVENTOR(S) : Uzun It is certified that error appears in the above-identified patent and that said Letters Patent is hereby corrected as shown below:

Column 5, line 65, in Claim 1, delete "including the steps of:" and insert -- [including the steps of:] *comprising*: --.
("comprising:" should be in Italics)

Column 5, line 66, in Claim 1, before "sorting" insert -- *a network node* --.
("a network node" should be in Italics)

Column 6, line 5, in Claim 1, before "assigning" insert -- *the network node* --.
("the network node" should be in Italics)

Column 6, line 7, in Claim 1, before "assigning" insert -- *the network node* --.
("the network node" should be in Italics)

Column 6, line 12, in Claim 1, delete "and" and insert -- [and] *the network node* --.
("the network node" should be in Italics)

Column 6, line 42, in Claim 5, delete "claim 5" and insert -- *claim 4* --.
("claim 4" should be in Italics)

Column 6, line 46, in Claim 6, delete "claim 5" and insert -- *claim 4* --.
("claim 4" should be in Italics)

Signed and Sealed this
Seventh Day of June, 2011

David J. Kappos

David J. Kappos
*Director of the United States Patent and Trademark Office*